United States Patent [19]

Vantonen

[11] Patent Number: 5,028,209
[45] Date of Patent: Jul. 2, 1991

[54] WIND POWER PLANT CONSTRUCTION

[76] Inventor: Reijo Vantonen, Laajavuorentie 3 as 1, SF-01620 Vantaa, Finland

[21] Appl. No.: 460,161
[22] PCT Filed: Jul. 20, 1988
[86] PCT No.: PCT/FI88/00119
§ 371 Date: Feb. 2, 1990
§ 102(e) Date: Feb. 2, 1990
[87] PCT Pub. No.: WO89/00647
PCT Pub. Date: Jan. 26, 1989

[30] Foreign Application Priority Data

Jul. 21, 1987 [FI] Finland ............... 873208

[51] Int. Cl.[5] ............... F03D 07/04
[52] U.S. Cl. ............... 416/87; 416/131; 416/132 B; 416/135; 416/141
[58] Field of Search .......... 416/9, 131, 132 R, 132 B, 416/133, 138–139, 141, 135, 87, 88, 89; 290/44, 55

[56] References Cited

U.S. PATENT DOCUMENTS

| | | | |
|---|---|---|---|
| 191,168 | 5/1877 | Nesbitt | 416/138 |
| 192,931 | 7/1877 | Palmer | 416/138 |
| 302,285 | 7/1884 | Russell | 416/131 X |
| 603,806 | 5/1898 | Zwiebel | 416/9 |
| 2,247,929 | 7/1941 | Terhune | 416/139 A X |
| 2,464,234 | 3/1949 | Jocobs | 416/136 |
| 4,087,202 | 5/1978 | Musgrove | 416/132 B X |
| 4,299,537 | 11/1981 | Evans | 416/132 B X |
| 4,310,284 | 1/1982 | Randolph | 416/132 B |
| 4,799,860 | 1/1989 | Martin | 416/139 A X |

FOREIGN PATENT DOCUMENTS

| | | |
|---|---|---|
| 1573687 | 8/1980 | European Pat. Off. |
| 2065787 | 7/1981 | European Pat. Off. |
| 618088 | 9/1935 | Fed. Rep. of Germany |
| 647287 | 6/1937 | Fed. Rep. of Germany |
| 72783 | 3/1987 | Finland |
| 401241 | 4/1978 | Sweden |
| 846777 | 7/1979 | U.S.S.R. ............... 290/55 |

Primary Examiner—Edward K. Look
Assistant Examiner—James A. Larson
Attorney, Agent, or Firm—Kane, Dalsimer, Sullivan, Kurucz, Levy, Eisele and Richard

[57] ABSTRACT

A wind power plant construction includes a turbine with at least two blades, a shaft, and blade angle control apparatus. According to the wind power plant construction shown, supports are rigidly connected to the shaft substantially radially thereto, and are coordinated with the blades. At the extreme ends of the supports are flapping pivots, to which the blades are attached. The blade extends from the flapping pivot towards the shaft; that portion of the blade doing so constitutes an arm to which a control means is connected. The blade is weighted so that the centroid line and axis of rotation of the blade lie closer to the leading edge of the blade than does the buoyancy center.

6 Claims, 3 Drawing Sheets

WIND POWER PLANT CONSTRUCTION

BACKGROUND OF THE INVENTION

The present invention concerns a wind power plant construction.

In existing wind power plants the blades of the turbines are fixed comparatively firmly to the shaft so that the turbine can withstand the torques and other stresses even from powerful gusts of wind. This means that adjustment of the turbine blades is made afterwards, that is after the effect of wind on the turbine has been observed, or no blade adjustment whatsoever is undertaken and the turbine is instead controlled with brakes. Such structural designs involve heavy and expensive blade structures, with the consequence that the supporting and bearing arrangements are also required to possess very high durability.

The object of the invention is elimination of the drawbacks mentioned. The specific object of the invention is to provide a wind power plant construction which automatically and continously adjusts the blades in accordance with wind strength and load variations so that the powerful, varying stress-imposing forces caused e.g. by gusts are attenuated before being transmitted to the structures. It is likewise an object of the invention to provide a turbine design which is light and favourable in manufacturing cost, enabling a wind power plant to be constructed which has a good energy production/price ratio.

SUMMARY OF THE INVENTION

The power plant construction of the invention comprises a turbine having at least two blades, with shaft and blade angle control means. As taught by the invention, to a fixing hub attached to the shaft is rigidly connected for each blade a radial brace substantially radial relative to the shaft, on its extreme end carrying a flapping pivot, advantageously a ball joint, to which the blade is substantially affixed. The flapping pivot takes up those centrifugal and gravity forces acting on the blades which are produced in operation and transmits from the blade the reaction forces paralleling the turbine shaft and the plane of rotation, and serves as point of support and bearing for the torques acting about the axis of rotation of the blade. It also permits changes of the angle of the blade's axis of rotation relative to turbine shaft and plane of rotation. Furthermore, according to the invention the blade extends from the flapping pivot towards the shaft, thus forming an arm to which a control rod associated with the blade angle control means is connected with the aid of a pivot, and a rotation support for the blade root, located on the axis of rotation of the blade. The blade moreover comprises separate weights, or its design has been so arranged that the centroid line of the blade lies forward of the aerodynamic centre of the blade, i.e., on the leading edge side, the axis of rotation passing through the blade pivot lying forward of the buoyancy centre of the blade profile, i.e., on the leading edge side.

The advantage of the invention over the state of art consists of the fast and accurate control characteristics of the device, which enable structures to be employed which are substantially lighter, and at the same time less expensive, than any existing blade, pivot, bearing and support structures because large force variations, which stress the structures, have been eliminated by means of continuous and accurate control.

BRIEF DESCRIPTION OF THE DRAWINGS

The invention is described in detail in the following, reference being made to the attached drawings, wherein.

DESCRIPTION OF THE PREFERRED EMBODIMENT

Figures 1, 2:
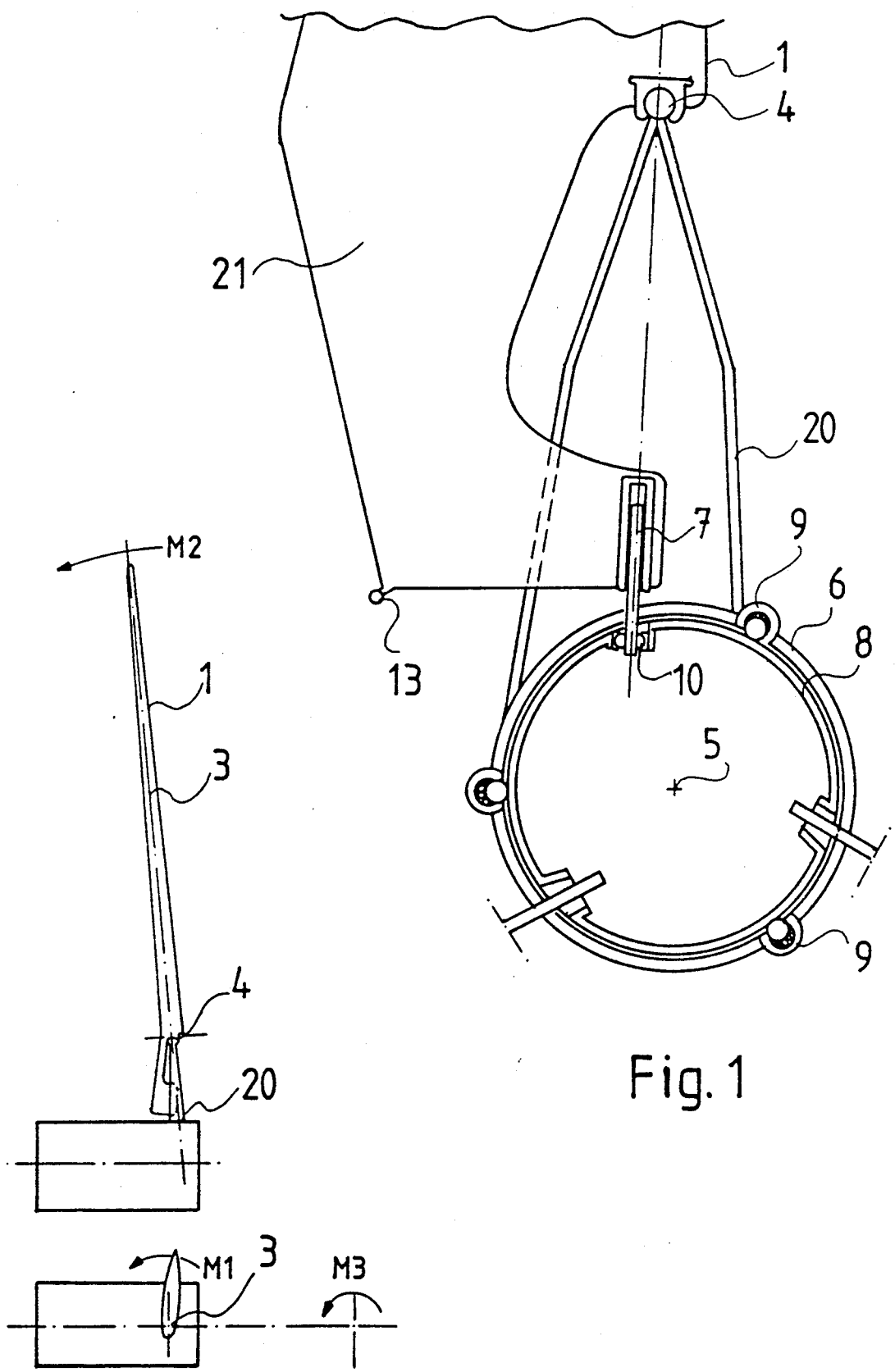
FIG. 1 presents, viewed in axial direction, a blade and turbine centre design according to the invention.
FIG. 2 presents the blade construction of FIG. 1, in elevational view.
Figure 3:
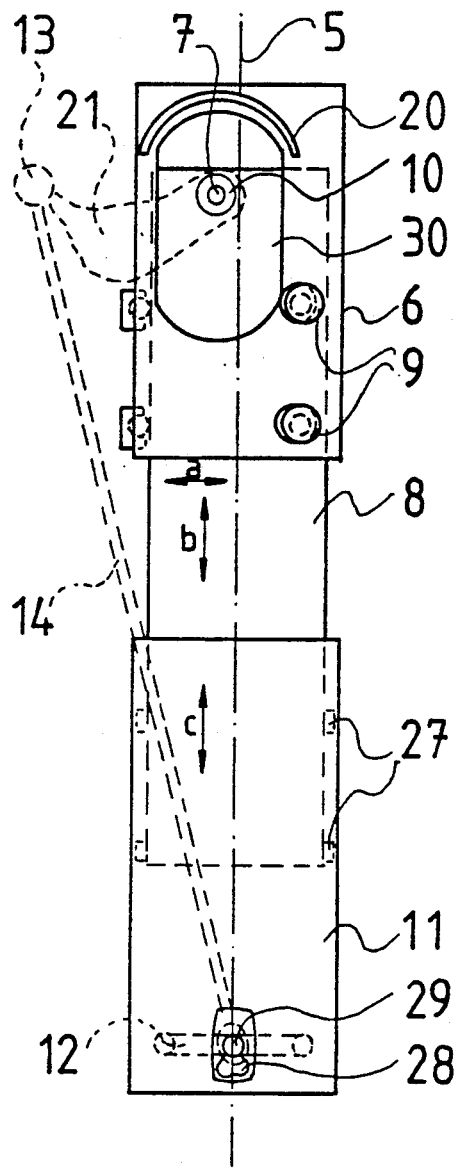
FIG. 3 presents part of the control means of the invention.

Referring to FIG. 1, presenting a wind power plant construction according to the invention, this construction comprises three hard-shelled turbine blades 1 having an airfoil-shaped cross section and their centroid coinciding or nearly coinciding with the axis of rotation 3 of the blade. Shifting the centroid may be accomplished with additional weights or, for instance when the blade predominantly consists of fibre glass, plastic, aluminium or any other light-weight material, the leading edge may have a thicker shell or consist of heavier material.

On the axis of rotation 3 of the blade, spaced from the blade root, is provided a flapping pivot 4 by which the blade is attached to an elongated support 20 which is radial relative to the turbine shaft 5. The support is rigidly fixed on the fixing hub 6 of the flapping pivot, this hub being a member concentric with the axis of rotation 5 of the turbine and connected with the shaft, and in the present embodiment having circular cross section.

The flapping pivot takes up the centrifugal forces acting on the blades which are produced, and those resulting from gravity, and it transmits from the blade the forces paralleling the turbine shaft and the torque acting around the turbine shaft, and serves as point of support and bearing for the torques acting around the axis of rotation of the blade, in the case of each blade. The flapping pivot also permits changes of the angle of rotation of the blade relative to the turbine shaft and the plane of rotation. Therefore, the flapping pivot is preferably a ball joint.

The blade forms an arm 21 from the pivot 4 towards the hub 6, on the end of this arm at the root of the blade is provided the blade root rotation support 7, rotatably carried in the bearing 10 on the flapping slide 8. The support allows the distance between the pivot 4 and the bearing 10 to change and the blade to rotate into a position consistent with free passing flow, from the normal blade angles. The flapping slide has likewise circular cross section and it is rotatably carried with the aid of bearings 9 in the flapping pivot fixing hub 6, inside the hub. The flapping slide 8 moves parallel to the turbine shaft and to the plane of rotation, actuated by the supports 7 coming from the individual blades. The support 7 is carried with a bearing 10 in the flapping slide in such manner that the bearing permits movements parallel to the axis of rotation and the plane of rotation, at the same time providing support for the blade rotation axis.

The fixing hub 6 presents a comparatively large aperture 30 at the location of each bearing 10 on the flapping slide 8. Hereby the rotation support 7 passes through said aperture, and the size of the aperture enables movements of the support both when the flapping slide rotates (a) and when it slides longitudinally (b) relative to the fixing hub. The support 7 is connected to the blade, to its root, with a sleeve-like slide bearing, which permits the length of the support to change. Particularly suitable to this purpose is a conventional shock absorber, used in cars, which is fixed on the root of the blade and attached to the flapping slide 8 with a pivot 10.

On the flapping slide 8 has also been carried, with bearings 27, another power control slide 11 at the other end of the flapping slide, this power control slide having a cross section substantially conforming to the fixing hub 6 on which the flapping pivots are mounted. The power control slide 11 is movable relative to the flapping slide 8 only parallel to the turbine shaft (c). The position of the power control slide 11 relative to the slide 8 determines the magnitude of the joint blade angle of the blades. On the blade root, spaced from the support 7, a pivot 13 has been provided, and a control rod 14 has been carried therefrom to the pivot 12, mounted on the power control slide 11, which serves to equalize the torques of the individual blades. This equalizing pivot 12 is so carried on the slide 11 that the bearing 28 permits movement of the joint 29 on the end of the control rod 14 substantially parallel to the axis of rotation of the turbine, relative to the power control slide 11. The joints 29 are equally spaced from the bearing 28. The bearing 28 is located on the axis of rotation 5 of the turbine, and the equalizing pivot 12 consists of three pins radially interconnected at one end. It is thus understood that at the juncture of said pins, that is in the centre, there is the bearing 28, and the joints 29 are located on the other ends of the pins. All blades being connected by control rods to the equalizing pivot, this pivot will transmit the force produced by the torque of each blade, and transmitted by the pivot 13 and the control rod 14, over the respective pivots 13 and control rods 14 to the other blades. Hereby the equalizing pivot permits changes of blade angle while the joint blade angle value of all blades is constant.

The pivot 13 attached to the blade and transmitting the force arising from torque is located at the root of the blade, on the trailing edge side of the blade profile.

Figure 4:
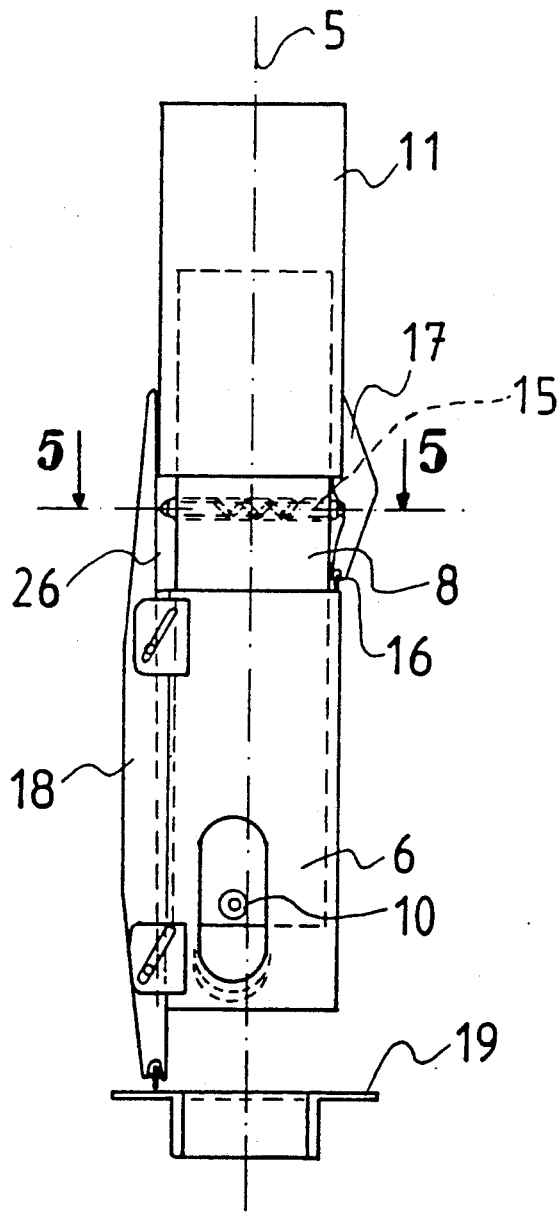
FIG. 4 presents part of the control means of the invention.
Figure 5:
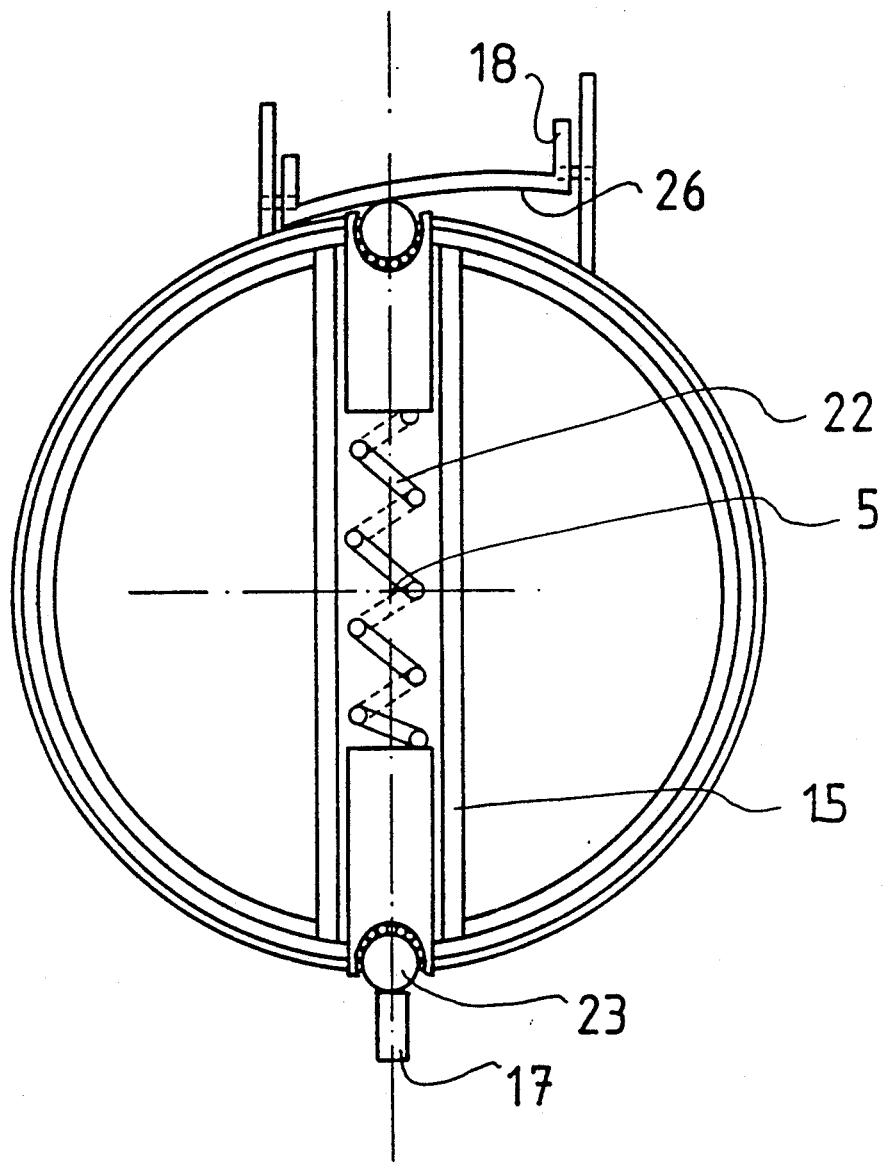
FIG. 5 shows the section along the line 5—5 in FIG. 4.

As can be seen in FIGS. 4 and 5, a spring means 15 has been provided on the flapping slide 8, carrying on both ends a bearing arrangement 23 in each of its parts which are radially movable relative to the axis of rotation of the turbine, e.g. spherical or slide bearings, and between these bearing arrangements a spring 22 which urges the bearing arrangements outward, away from each other. To the power control slide 11 is attached a rolling support 17 actuating the spring means 15. On the end of the rolling support 17 is mounted a bearing 16 which rests against the suitably shaped margin of the hub 6 when the flapping slide 8 moves into the hub 6, nearly to its extreme position. When the power control slide 11 and the flapping slide 8 move relative to each other, said rolling support transmits forces to the spring 22, with the aid of its curved rolling surface.

Against one bearing arrangement 23 of the spring means 15 rests a spring force-control rolling support 18, which has been rotatably carried on the fixing hub 6 in such manner that movement parallel to the turbine shaft on the control rolling support will change the spring force of the spring means 15. The rolling surface 26 of the support 18 nearly parallels the axis of rotation of the turbine, slanting slightly relative to said direction, whereby its axial movement against the bearing arrangement 23 either tightens or loosens the spring 22. The control rolling support carries on its upwind end a power control plate 19, movable in axial direction and rotatably carried on the turbine shaft. It is possible by regulating the distance of said power control plate from the fixing hub 6, to alter or totally eliminate the spring force of the spring means 15. As can be seen in FIG. 5, the rolling surface 26 has also a given breadth, so that the distance of the surface 26 from the axis of rotation 5 increases uniformly from one margin to the other of said surface. Hereby, when relative to the plane of rotation of the turbine the angle of the flapping slide 8 changes relative to the fixing hub 6, the spring force transmitted by the bearing 23 is reduced when the slide 8 turns in the direction in which the turbine is rotating.

The wind power plant construction of the invention operates as follows. When the flow velocity and direction of the wind vary, the turbine with its controls attenuates such changes and automatically delimits the shaft power at the desired value.

When the flow starts to accelerate from zero velocity, reaction forces caused by the flow begin to act on the blade assembly of the stationary turbine. The surface of the blade facing the flow is subject to a force which can be considered to act on the surface area centroid. Certain corresponding torques M1 and M2 are then produced around the axis of rotation of the blade and the flapping pivot, respectively. If the flow is not perfectly square against the blade system of the turbine, a torque M3 tending to turn the orientation mechanism of the turbine is also produced. The spring force of the spring 22 in the spring means 15 in the control apparatus opposes the torques M1 and M2 over the pivots 13, the control rods 14, the equalizing joint 12, the power control slide 11, the rolling surface of the rolling support 17 and the bearing 16. The torque M3 acts without restriction and swivels the turbine to meet the flow at right angles.

When the spring force of the spring means 15 is not able to provide sufficient resistance, the blades will incline about the flapping pivots down the wind and they will at the same time rotate slightly about their axes of rotation in the direction in which the torque M1 acts. As a consequence, the blades begin to guide the flow away from the direction of free flow, and as soon as the arising component of the reaction force which is perpendicular against the radius of the plane of rotation and parallel with the plane of rotation surpasses the counteracting load from the machinery that has to be driven, this component will set the turbine in motion.

When the turbine starts, the relative direction of flow incidence on the blades changes, and at the same time the reaction forces caused by the flow increase and shift from their centres on the blades towards the outer periphery of the turbine and closer to the axis of rotation of the blade. At the same time a centrifugal force is also generated which changes the flapping angle in the upwind direction, and the torque M2 becomes less. The blades turn with the aid of the spring force of the spring 22 in the direction opposite to the direction in which the torque M1 acts, and likewise a torque is produced owing to centrifugal force, about the axis of rotation of each blade, in the direction opposite to the torque M1. Caused by appropriate shaping of the turbine blade, the flow changes direction and gives rise to a continuous reaction force rotating the turbine with acceleration. The turbine is accelerated and the blades assume a position determined by the resultant of centrifugal force, of the reaction force acting on the blades and of gravity at each value of the peripheral angle, the spring force of the spring 22 changing this position minimally only. The turbine blades assume their pre-set normal-operation blade angles and the blade angles vary as the equalizing joint 12 transmits equal forces opposing the torque M1 to each blade.

When the turbine is rotating without load, that is when the shaft power produced by the turbine is not utilized, the turbine will reach a certain speed of rotation which is determined in accordance with the force with which the rolling surface of the rolling support 17 presses down on the spring means 15. If the spring force of the spring means 15 has been adjusted with the control rolling support 18 to a given constant value, a constant speed of rotation is achieved with appropriate shaping of the rolling surface of the control rolling support 18, and the turbine will rotate at this speed at various wind velocities when it is free of load.

When the speed of rotation of the turbine relative to the flow velocity is constant and the turbine is loaded in accordance with the shaft power produced by the turbine, at various speeds of rotation, the flapping angle of the blade is constant at different speeds of rotation with one and the same value of the peripheral angle. The effect of gravitation on the peripheral angle of the blade is such that the flapping angle tends to increase when the blade is up on top and to decrease when it is down at the bottom. The flapping slide 8 interconnects the roots of the blades and attenuates the changing tendencies of the flapping angle. The equalizing joint 12 corrects by a change of angle of incidence the variations of forces parallel to the turbine shaft, due to differences of flow velocity and direction, at various values of the peripheral angle and when the incoming flow direction varies, opposing the effect of the torque M3 causing turning about the alignment mechanism, and reduces the effect of gyroscopic forces on the structures.

When in the course of increasing flow velocity that shaft power is reached which one does not wish to exceed, power control sets in, making use of the torque M1 acting about the axis of rotation of the blade. The force arising from the torque M1 over the control rod 14 is transmitted, over the equalizing joint 12, to the power control slide, to which the rolling support 17 has been attached. The curved rolling surface of the rolling support 17, resting against the bearing 23 of the spring means 15, has been shaped so that it transmits to the power control slide from the spring means 15 an appropriate counterforce to the above-mentioned force, at different values of the blade angle. If the load does not increase along with the shaft power, the angle of the axis of rotation of the blade relative to the raduis of the plane of rotation of the turbine will change to be smaller relative to the plane of rotation, and the flapping slide 8 will rotate in the direction of rotation of the turbine and the rolling surface of the rolling support 18 will permit reduction of the spring force of the spring 22 in the spring means 15, and the power control slide 11 is enabled to move, changing the blade angles so that the shaft power produced by the turbine will remain consistent with the load.

If the load increases, exceeding the shaft power, the speed of rotation of the turbine goes down in relation to the flow velocity. The flapping angle then increases and the flapping slide 8 moves towards the fixing hub 6 and rotates within the fixing hub 6 in the direction opposite to the direction in which the turbine is rotating. The bearing 16 mounted on the end of the rolling support 17 interacts with the suitably shaped margin of the hub 6 and forces the blade angles to change so that the speed of rotation goes down until the shaft power equals the load or the turbine comes to a standstill.

It is possible with the aid of the control rolling support 18 to change the spring force of the spring means 15 and, by its aid, the maximum shaft power. When the turbine should be stopped, the power control plate 19 is moved in such manner that the spring force of the spring means 15 vanishes and the blades are free to position themselves in the flow.

When the load increases in conformity with the shaft power, the turbine tends in the event of fluctuating flow velocity to follow up with its speed of rotation, in order to maintain a constant ratio of flow velocity and peripheral velocity. If the flow slows down so rapidly that the momentum of the turbine with its ancillary equipment exceeds the momentum which the load requires as the turbine slows down, the flapping angle will descrease and the blade angles are not changed, and the turbine will slow down consistent with the load. When the flow accelerates at a rate faster that that at which the turbine with ancillaries is able to accelerate, the flapping angle will increase and the blade angles will change, reducing the accelerating tendency of the turbine.

When the turbine is rotating at constant or nearly constant speed of rotation and the load varies along with the shaft power, the flapping angle, the angle subtended by the axis of rotation of the turbine blade and the radius of the plane of rotation of the turbine and the shaft power vary essentially simultaneously. When the flapping angle exceeds the value at which the bearing 16 mounted on the end of the rolling support 17 meets the margin of the hub 6, the shaft power will be limited. When the flow slows down to standstill, the turbine will stop in such manner that the blades remain positioned at the normal-operation blade angles.

In the foregoing the invention has been described in detail, referring to an advantageous embodiment thereof, which however does not confine the invention, different embodiments of the invention being allowed to vary within the inventive idea delimited by the claims. Thus, the invention is, for instance, applicable in connection with turbines having a different number of blades.

I claim:

1. A wind power plant construction comprising a turbine with at least two blades, a shaft, and blade angle control means, characterized in that:

a fixing hub is connected to said shaft, said fixing hub having rigidly attached supports extending substantially radially relative to said shaft and coordinated with said blades, said supports having extreme ends with flapping pivots to which said blades are attached, a portion of each of said blades extends from said flapping pivots towards said shaft, said portion constituting an arm to which is connected a control rod associated with said blade angle control means, each of said blades is weighted so that the centroid line and axis of rotation of each blade lie closer to the leading edge of said blade than does the buoyancy center thereof, each of said blades further has a root, said root having a rotational support which is pivotally connected with a flapping slide, said flapping slide being rotatably carried within said fixing hub, and a power control slide to which the control rods of the blades are connected with the aid of an equalizing joint is carried on said flapping slide.

2. Wind power plant construction according to claim 1, characterized in that said fixing hub, said flapping slide and said power control slide are sleeve-like members disposed on said shaft, said flapping slide being axially and rotatably moveable within and relative to said fixing hub, said fixing hub and said power control slide being carried around said flapping slide, said power control slide being axially moveable relative to said flapping slide.

3. Construction according to claim 1, characterized in that said flapping slide comprises a spring means and said power control slide comprises a rolling support having a curved rolling surface in such manner that said spring means rests against said curved rolling surface of said rolling support when said flapping slide and said power control slide move relative to said fixing hub.

4. Wind power plant construction according to claim 3, characterized in that said fixing hub further comprises a control rolling support movably carried thereon, said control rolling support resting against said spring means so that the spring force of said spring means may be adjusted with the aid of said control rolling support.

5. Wind power plant construction according to claim 4, characterized in that said spring means comprises a spring, said spring having bearing arrangements at both ends thereof, said ends resting against said curved rolling surface of said rolling support and said control rolling support.

6. Construction according to claim 3, characterized in that said rolling support comprises a bearing which supports said rolling support against a margin of said fixing hub, said margin of said fixing hub facing said power control slide.

* * * * *

UNITED STATES PATENT AND TRADEMARK OFFICE
CERTIFICATE OF CORRECTION

PATENT NO. : 5,028,209

DATED : July 2, 1991

INVENTOR(S) : Reijo Valtonen

It is certified that error appears in the above-identified patent and that said Letters Patent is hereby corrected as shown below:

Title page, Item [19], delete "Vantonen" and substitute therefor --Valtonen--;

Title page, Item [76], delete "Vantonen" and substitute therefor --Valtonen--.

Signed and Sealed this

Twentieth Day of October, 1992

Attest:

DOUGLAS B. COMER

Attesting Officer

Acting Commissioner of Patents and Trademarks